United States Patent [19]

Truskalo

[11] Patent Number: 5,138,238
[45] Date of Patent: Aug. 11, 1992

[54] ARRANGEMENT FOR CORRECTING BEAM LANDING LOCATION ERROR IN A VIDEO DISPLAY

[75] Inventor: Walter Truskalo, Indianapolis, Ind.

[73] Assignee: Thomson Consumer Electronics, Inc., Indianapolis, Ind.

[21] Appl. No.: 701,725

[22] Filed: May 17, 1991

[51] Int. Cl.$^5$ .......................... G09G 1/04; H01J 29/56
[52] U.S. Cl. .................. 315/368.18; 315/391; 315/370
[58] Field of Search ............... 315/368, 370, 371, 405, 315/386, 394, 393, 391

[56] References Cited

U.S. PATENT DOCUMENTS

| | | | |
|---|---|---|---|
| 3,398,319 | 8/1968 | Lemke et al. | 315/391 |
| 3,398,320 | 8/1968 | Hursch | 315/391 |
| 4,321,511 | 3/1982 | Willis | 315/387 |
| 4,500,816 | 2/1985 | Murphy . | |
| 4,510,527 | 4/1985 | den Hollander . | |
| 4,611,151 | 9/1986 | Hoover et al. | 315/368 |
| 4,623,825 | 11/1986 | Wahlquist et al. | 315/368 |
| 5,034,664 | 7/1991 | Fernsler et al. | 315/370 |

OTHER PUBLICATIONS
U.S. Patent Ser. No. 515,972, entitled Parabola Generators with Auxiliary Reset Function, in the names of Fernsler et al.

Primary Examiner—Gregory C. Issing
Attorney, Agent, or Firm—Joseph S. Tripoli; Joseph J. Laks; Sammy S. Henig

[57] ABSTRACT

A winding of a transformer is wound around a core bead that surrounds a wire conducting a horizontal deflection current. Close to a time when zero crossing occurs in the horizontal deflection current, at the center of horizontal trace, the core of the transformer changes from being saturated to being nonsaturated and a pulse is produced in the transformer. The pulse triggers a one-shot multivibrator arrangement that produces a reset pulse. A horizontal rate parabolic voltage generator is responsive to the reset pulse for generating a horizontal rate parabolic voltage that is coupled to an auxiliary coil mounted on a cathode ray tube to produce, for example, a vertical convergence error correction current.

25 Claims, 5 Drawing Sheets

ARRANGEMENT FOR CORRECTING BEAM LANDING LOCATION ERROR IN A VIDEO DISPLAY

The invention relates to a correction arrangement for correcting a beam landing location error in a cathode ray tube (CRT).

In some prior art projection television receivers, a correction signal such as a horizontal rate parabola is generated and coupled via an amplifier to an auxiliary coil such as a vertical convergence auxiliary coil of a beam landing location error correction arrangement for correcting, for example, a vertical convergence error. Such parabola generator that includes a ramp generator and an active integrator controlled by a reset pulse, having timings that coincide with the leading and trailing portions of a horizontal flyback pulse, is disclosed in U.S. patent application Ser. No. 515,972—Fernsler et al., entitled, PARABOLA GENERATORS WITH AUXILIARY RESET FUNCTION. The reset pulse resets the horizontal rate parabola, generator by discharging a capacitor in the ramp or sawtooth generator that is coupled to the active integrator circuit which produces the horizontal rate parabola by integration of the ramp signal at the horizontal scanning rate.

In a progressive scan television receiver in which the horizontal scan frequency is $2xf_H$, $f_H$ being about 16 KHZ, such reset pulse may be required to have a leading edge that precedes a leading portion of a flyback or retrace pulse produced in a main horizontal deflection coil of a deflection yoke by, for example, 1.5 microseconds and a trailing edge that precedes a trailing portion of the retrace pulse. The early reset pulse may be required because a delay time in the amplifier that drives the auxiliary coil in the $2xf_H$ system is more critical than in a receiver in which the horizontal scan frequency if $f_H$.

In accordance with an aspect of the invention, this early reset pulse is generated using a transformer having a primary winding in series with one of the main horizontal deflection coils for generating in the transformer a pulse at the center of a horizontal trace interval. The pulse generated in the transformer is coupled through a transistor and a one-shot multivibrator arrangement to generate the aforementioned reset pulse which is dependent on the deflection current rather than on the flyback pulse.

In accordance with another aspect of the invention, the reset pulse, provided for a beam landing location error correction circuit, slightly precedes a flyback pulse. In carrying out an inventive feature, the reset pulse is closely related to the particular scan line to which the flyback applies, and thereby more accurately times the correction output during the scan line.

In accordance with a further aspect of the invention, the reset pulse is generated by sensing a main horizontal deflection current and by producing a pulse approximately when zero crossing occurs in the horizontal deflection current.

In accordance with an additional aspect of the invention, the horizontal rate reset pulse is generated using a bead transformer coupled to the main horizontal deflection current.

A video display apparatus, embodying an aspect of the invention, includes a cathode ray tube having an evacuated glass envelope. A display screen is disposed at one end of the envelope and an electron gun assembly is disposed at a second end of the envelope. The electron gun assembly produces an electron beam that forms a raster at electron beam landing locations on the screen. A main horizontal deflection winding and a main vertical deflection winding are disposed on a neck of the cathode ray tube. A horizontal deflection current is generated in the horizontal deflection winding and a vertical deflection current is generated in the vertical deflection winding for producing a main deflection field in a beam path of the electron beam that varies in a manner to vary the electron beam landing location. A pulse having a transition edge that occurs during a given trace interval of one of the deflection currents is generated. An arrangement generates and synchronizes a waveform of a second field that is generated in the beam path. The waveform of the second field is synchronized by the transition edge of the pulse and varies in accordance with the variation of the beam landing location to correct for an electron beam landing error.

Figure 1:
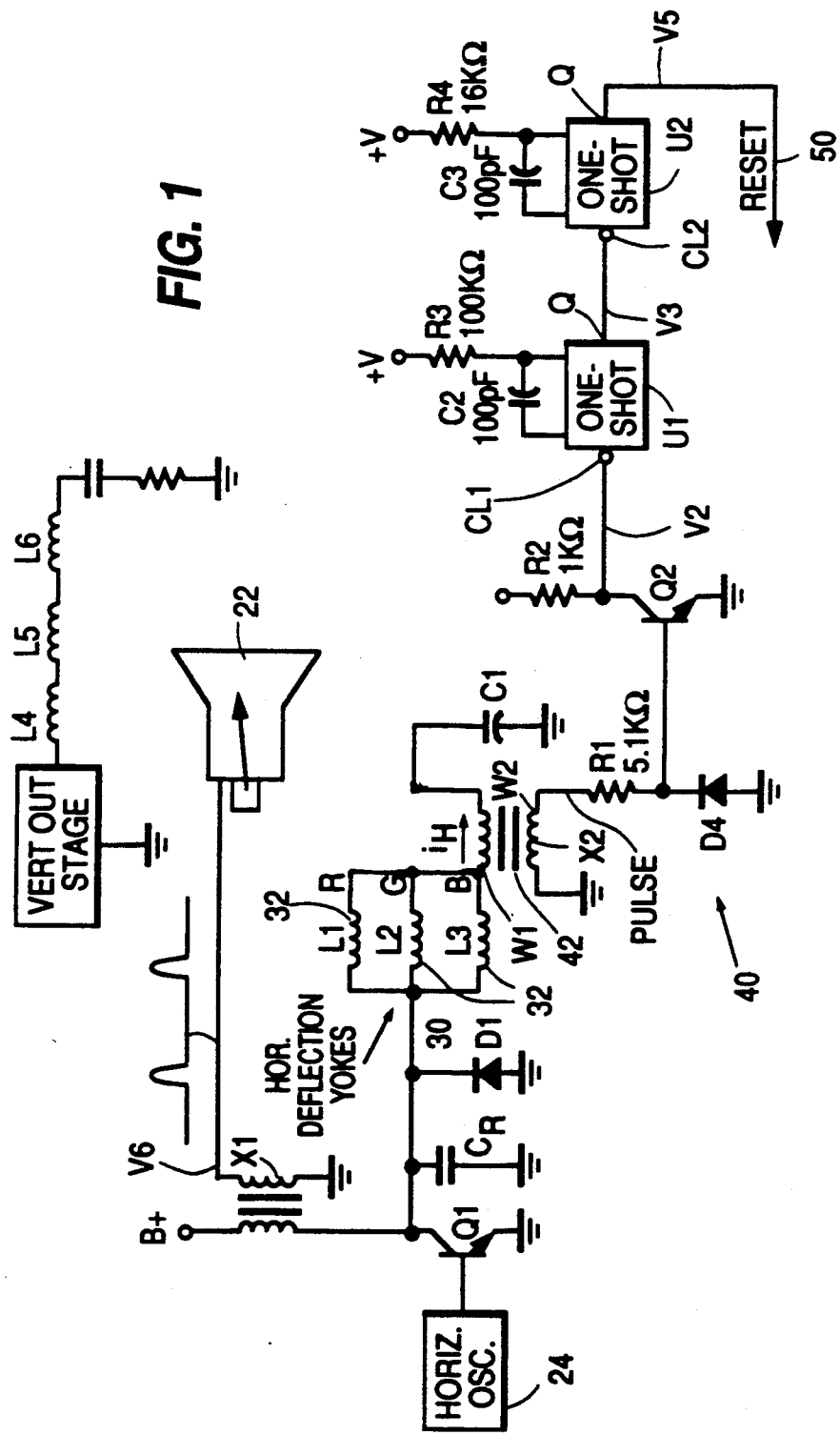
FIG. 1 is a schematic block diagram illustrating the generation of a reset signal from the horizontal deflection current, according to the invention.

In FIG. 1, a CRT 22 of a projection television receiver produces an electron beam. Horizontal and vertical deflection coils cause the beam to scan beam landing locations across the screen of CRT 22, in horizontal lines which are vertically displaced to form a raster. A horizontal oscillator 24 is coupled to a horizontal output transistor Q1 having a collector that is coupled to a horizontal flyback transformer X1. The emitter of transistor Q1 is grounded. A signal is applied to the base of transistor Q1 to cause transistor Q1 to switch at the frequency $2xf_H$ and to conduct from a B+ power supply of +140 volts through transformer X1. Transformer X1 may have various secondary windings for producing, for example, a flyback, filament output pulse V6, during retrace, as shown generally in FIG. 1. The collector of transistor Q1 is coupled to a damper diode D1, a retrace capacitor $C_R$ and a parallel arrangement of main horizontal deflection coils L1, L2 and L3 having, each, an inductance of 750 $\mu H$ which produce horizontal deflection fields for scanning the beams over a repetitive scanning period in each CRT of the receiver. A trace capacitor C1 is coupled in series with a parallel arrangement of the horizontal deflection coils. A ramp, horizontal deflection current $i_H$ causes the electron beam to scan from a maximum deflection at one side of the screen, through zero deflection at the center of the screen, to maximum deflection of opposite polarity at the opposite side of the screen.

Horizontal deflection coils L1, L2 and L3 are coupled in parallel, one for each of the red, blue and green CRTs of the projection television receiver. However, in a television apparatus having only one horizontal deflection coil, only one coil would be used. In the projection television receiver, separate horizontal deflection coils L1, L2 and L3 are needed for each CRT, and these may be coupled in parallel as shown in FIG. 1. Main vertical deflection coils L4, L5 and L6 provide vertical deflection in the CRTs.

Main horizontal deflection current $i_H$ that flows through the parallel arrangement of coils L1, L2 and L3 that is coupled in series with a primary winding W1 of transformer X2 is about 10 A peak-to-peak, and shaped substantially as a sawtooth current at the horizontal scan frequency. The horizontal scan frequency is $2xf_H$, or about 31, 500 Hz, having a period of about 32 microseconds.

In carrying out an inventive feature, transformer X2 is a bead transformer in the form of a toroidal magnetically permeable core CORE having primary winding W1 that is coupled in series with the parallel arrangement of deflection coils L1, L2 and L3. Transormer X2 has, for example, winding turns or wraps forming a secondary winding W2, as shown in more detail in FIG. 4. Similar symbols and numerals in FIGS. 1 and 4 indicate similar items or functions.

Figure 4:
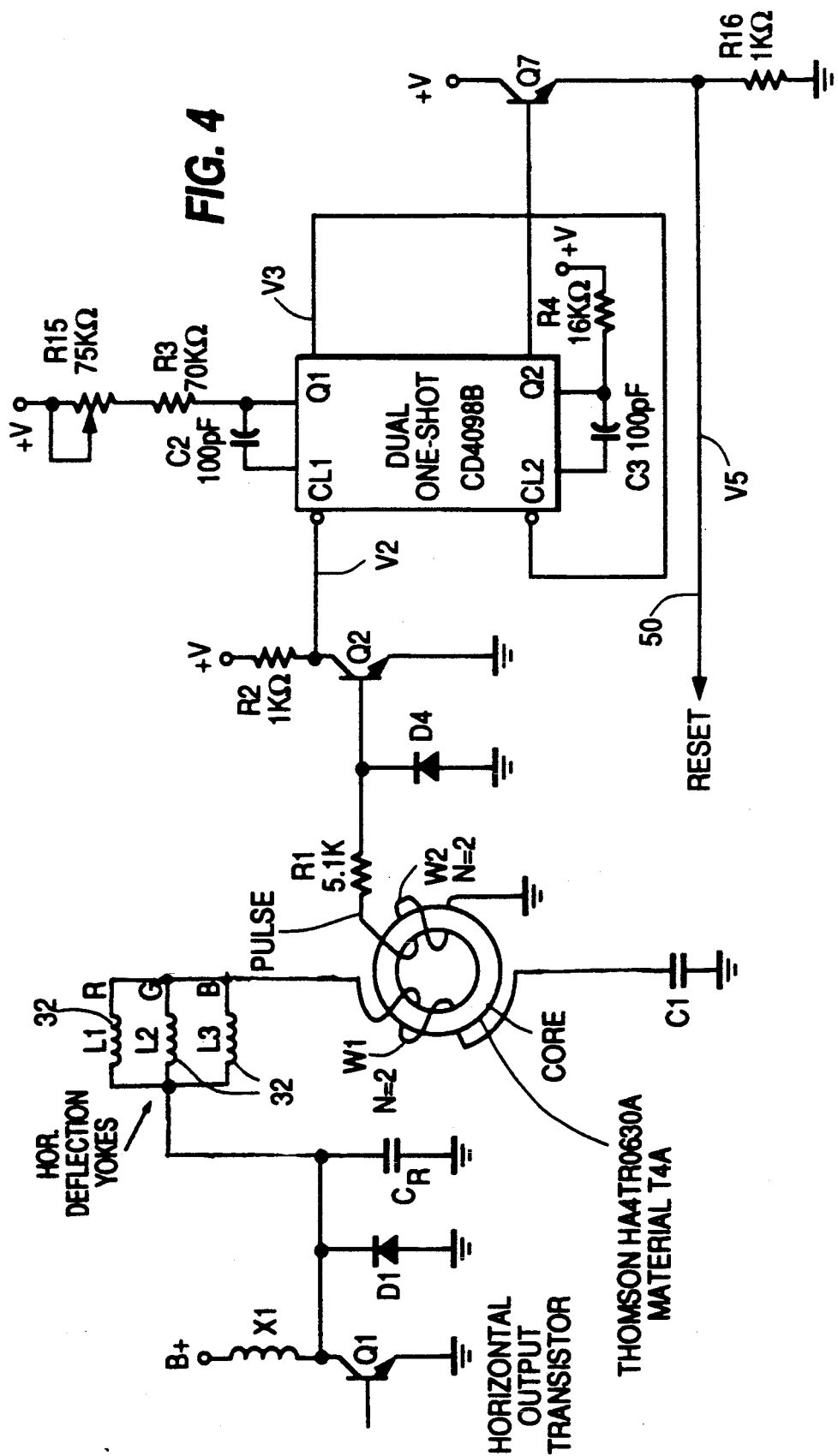
FIG. 4 is a schematic diagram showing the way the reset signal of FIG. 1 is generated using a bead transformer responsive to the horizontal deflection current.

The toroidal core of transformer X2 of FIG. 4 saturates when current $i_H$ is at about $i_H = 1$ A in the primary winding. As a result of changes in flux in transformer X2, from an instant prior to a time when zero crossing of deflection current $i_H$ occurs to an instant after the zero crossing occurs, at the center of horizontal scan or trace, secondary winding W2 produces a voltage pulse PULSE of about 7 V.

Pulse PULSE produced in the secondary winding W2 of toroidal transformer X2 of FIG. 1 is coupled to the base of a transistor Q2 through a resistor R1 and clamped substantially positive relative to ground by a diode D4. The collector of transistor Q2 is coupled to a DC supply voltage of, for example 15 VDC via a load resistor R2. Transistor Q2 produces a low going square pulse V2 on its collector, shown in the timing diagram of FIG. 5. Similar symbols and numerals in FIGS. 1, 4 and 5 indicate similar items or functions. The collector of transistor Q2 of FIG. 1 is coupled to a triggering, low-true input CL1 of a first monostable multivibrator or one-shot U1. One-shot U1 generates a high going pulse V3 of FIG. 5 on its Q output of FIG. 1.

Figure 5:
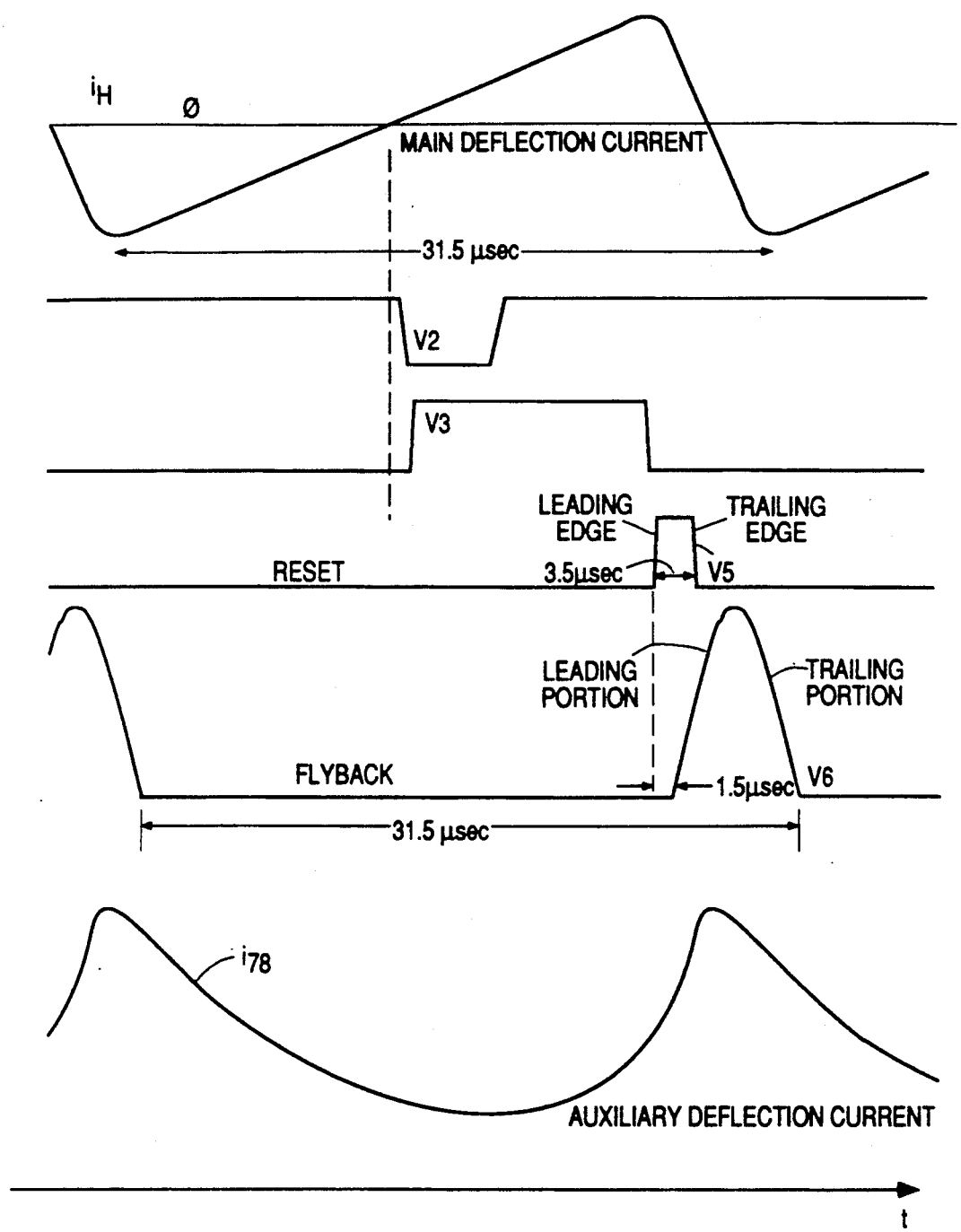
FIG. 5 is a timing diagram showing waveforms useful for explaining the operation of the circuits of FIGS. 1 and 4.

One-shot U1 determines a length of a period between pulse PULSE, that is related to the zero cross of current $i_H$ through the parallel arrangement of main deflection coils L1, L2 and L3, and a leading edge of a reset pulse V5 of FIG. 5. Pulse V5 occurs on the dropping or trailing edge of pulse V3. This time period is set by an R-C time constant of a capacitor C2 and a resistor R3 of FIG. 1, coupled between the appropriate inputs to one-shot U1 and the positive supply voltage V+. As shown in FIG. 4, the precise time period established by one-shot U1 can be made adjustable by including a trimmer potentiometer R15 in series with resistor R3, for setting up the timing of reset pulse V5 of FIG. 5 relative to flyback pulse V6.

The Q or positive going output of one-shot U1 of FIG. 1 is coupled to a triggering, low going input CL2 of a second one-shot U2. One-shot U2 generates reset pulse V5 of FIG. 5 at the trailing edge of delay pulse V3 produced in one-shot U1 of FIG. 1. The second one-shot, U2 has a time constant defined by a capacitor C3 and a resistor R4, preferably about 2.5 microseconds long. The output of one-shot U2 of FIG. 1 is coupled to an emitter follower transistor Q7 of FIG. 4, having a base coupled to the Q output of one-shot U2, a collector coupled to the positive supply V+, and an emitter coupled to ground through resistor R16. Transistor Q7 thus forms a driver for driving a line 50 to develop pulse V5 on line 50.

Figure 2:
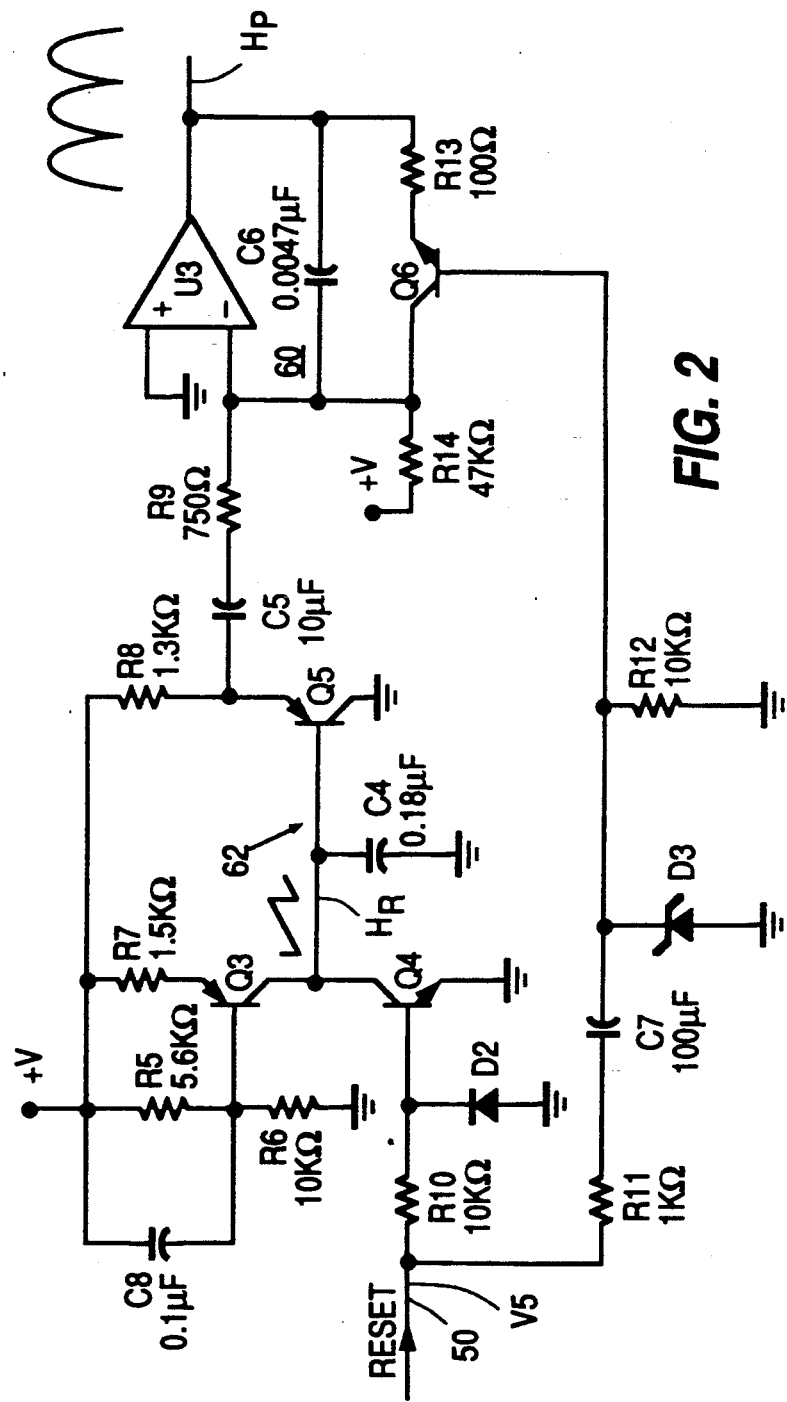
FIG. 2 is a schematic diagram, illustrating a parabola generator responsive to the reset signal of FIG. 1 that includes a ramp generator and an integrator.

FIG. 2 illustrates a ramp generating section 62 responsive to pulse V5 of FIG. 1 and a parabola generating section 60. Similar symbols and numerals in FIGS. 1, 2, 4 and 5 indicate similar items or functions.

Figure 3:
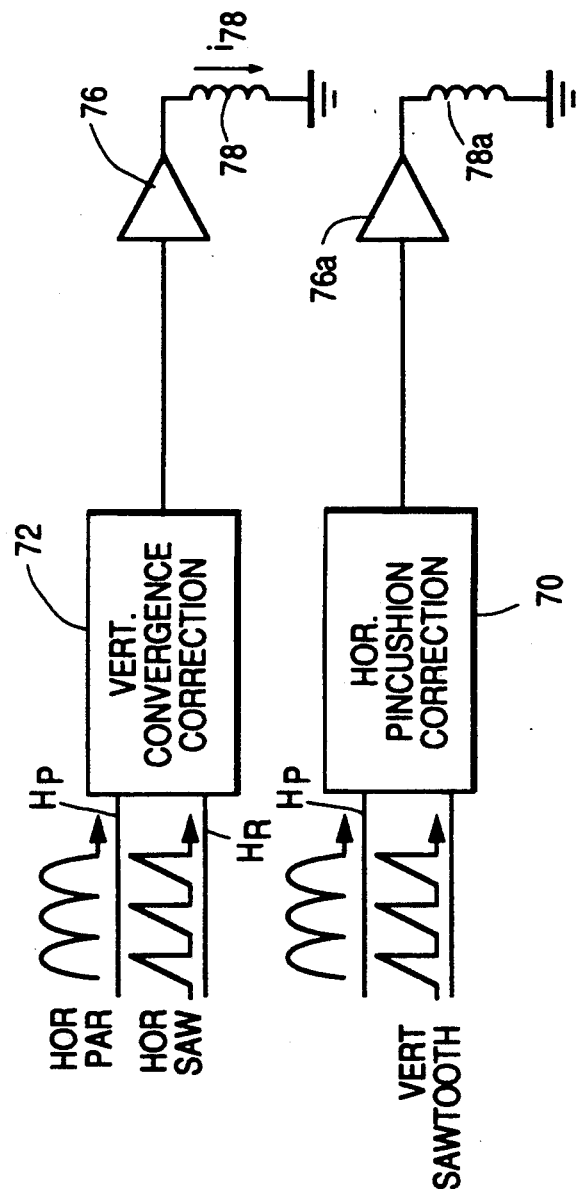
FIG. 3 is a schematic block diagram illustrating the application of parabola and ramp signals produced in the arrangement of FIG. 2 to a vertical convergence coil.

Parabola generating section 60 of FIG. 2 is AC coupled to a ramp signal $H_R$ from ramp section 62, and produces a parabola signal $H_P$ by integration of the ramp. Parabola signal $H_P$, and also ramp signal $H_R$, are coupled via a beam landing location correction circuit such as, for example, a conventional vertical convergence correction circuit 72 and via an amplifier 76 to an auxiliary vertical deflection coil 78, as shown in FIG. 3. Similar symbols and numerals in FIGS. 1-5 indicate similar items or functions. The waveform of a current $i_{78}$ of FIG. 5 in coil 78 of FIG. 3 varies in a manner to vary a waveform of a magnetic field, not shown, produced by coil 78 to provide vertical convergence. Signal $H_P$ is also coupled to an auxiliary horizontal deflection coil, 78a, for correcting, for example, horizontal pincushion distortion error.

Ramp generating section 62 of FIG. 2 includes a constant current supply source, transistor Q3, which is a PNP transistor with its emitter coupled to the positive supply voltage V+ through a series resistor R7. The base of transistor Q3 is set at a predetermined voltage (about 5.4 V) by the voltage divider defined by resistors R5 and R6, coupled in series, between the supply voltage B+ and ground. A capacitor C8 decouples the base of transistor Q3 from the positive supply. Transistor Q3 conducts at a constant current level regardless of any changes in the voltage at its collector. The constant current from the collector of transistor Q3 charges capacitor C4 so long as a transistor Q4 is not turned on by pulse V5. Thus, pulse V5 synchronizes ramp generating section 62. The result is that each portion of signal $H_R$, throughout horizontal trace, occurs at a corresponding time that is determined by pulse V5.

The leading edge of reset pulse V5 occurs slightly before the flyback or retrace pulse V6, as shown in FIG. 5. Thus, pulse V5 is time shifted in a phase advance manner relative to retrace pulse V6 and in a phase delay manner relative to the pulse produced in transformer X2. Because reset pulse V5 is produced by sensing the zero crossing of horizontal deflection current $i_H$, variation in the phase of current $i_H$ will, advantageously, produce a corresponding phase shift of pulse V5. Moreover, reset timings of sections 62 and 60 is closely related to the particular scan line to which the flyback applies, and the correction output is accurately timed to the scan line. Horizontal rate reset pulse V5 resets the correction circuit of FIG. 2 at an accurately controlled time after the zero crossing of the main horizontal deflection current $i_H$.

Positive reset pulse V5 on line 50 is coupled to the base of switching transistor Q4 through a series resistor R10, and is clamped positive relative to ground by a diode D2. Transistor Q4 is coupled in parallel with capacitor C4, and conducts during reset, when pulse V5 is generated, to discharge capacitor C4, and to reset the ramp voltage to zero volts. In this manner, the voltage across capacitor C4 defines sawtooth signal $H_R$ at the horizontal scanning frequency.

Capacitor C4 is coupled to the base of a PNP transistor Q5. Transistor Q5 is arranged with a series resistor R8 as a follower amplifier, with the emitter of transistor Q5 tracking the sawtooth voltage across capacitor C4. The emitter of transistor Q5 is AC coupled through a series capacitor C5 and a series resistor R9 to an inverting input of an operational amplifier U3. Amplifier U3 is coupled to a feedback capacitor C6, and accordingly, functions to integrate the AC sawtooth signal from the follower amplifier of transistor Q5. The output of amplifier U3 is parabola signal $H_P$ at the horizontal rate.

Preferably, reset pulse V5 is arranged as shown in FIG. 2 to discharge feedback capacitor C6 as well as the ramp signal capacitor C4. When the feedback capacitor is discharged, amplifier U3 is effectively arranged as a follower amplifier, causing the output to be set to the voltage level of the non-inverting input, i.e., to ground. Feedback capacitor C6 is discharged by a switching transistor C6, coupled in series with a resistor R13 and in parallel with capacitor C6. The collector of transistor Q6 is coupled to the positive supply voltage V+ through resistor R14 such that resistors R13 and R14 bias transistor Q6.

Because the feedback capacitor C6 is smaller than the ramp capacitor C4, it can be discharged quickly. Preferably, capacitor C6 is discharged at the leading edge of reset pulse V5. Reset pulse V5, which is a positive square pulse on line 50, is coupled to the base of transistor Q6 through a series resistor R11, a series capacitor C7 and a parallel resistor R12. Capacitor C7 and resistor R12 together define a differentiator that generates a short high going pulse at the rising edge of reset pulse V5 and a short low going pulse at the dropping edge. The low going pulse is clamped relative to ground by a diode D3, which can be a zener diode as shown, thereby also limiting the positive voltage at the base of transistor Q6. During the high going differentiated pulse, capacitor C6 is discharged and the feedback capacitor is discharged, setting the output of amplifier U3 to zero.

Because the ramp generator is reset and the parabola generator is reset by the circuit shown, there is no tendency of the correction circuit to accumulate an error, coupling between vertical rate occurrences and the correction circuit is cancelled at every horizontal scan period, and the correction circuit recovers quickly from disturbances such as channel changes, as explained in detail in the Fernsler et al., patent application that is incorporated by reference herein.

The leading edge of pulse V5, advantageously, precedes the leading portion of pulse V6 by, for example, 1.5 microseconds. The trailing edge of pulse V5, advantageously, also precedes the trailing portion of pulse V6. Thus, each of the waveforms of ramp signal $H_R$ and parabola signal $H_P$ occurs earlier in the deflection cycle than if the timings of pulse V5 were to coincide with the timings of pulse V6. The result is that the waveform of the field produced by current $i_{78}$ in coil 78 is synchronized to pulse V5. In this way, a delay via amplifier 76 that may be more critical at the higher horizontal scan rate of $2xf_H$ is, advantageously, compensated.

By generating reset signal V5 slightly in advance of a flyback pulse, it is readily possible to achieve reset of the correction circuits in proper timed relationship with the horizontal scan, and without the need for complicated adjustments elsewhere in the horizontal deflection and distortion correction circuits. Accordingly, the result is a dependable correction parabola and sawtooth currents for beam landing errors such as geometric distortion, convergence error and the like, even at the more demanding $2xf_H$ rate.

What is claimed is:

1. A video display apparatus, comprising:
   a cathode ray tube including an evacuated glass envelope, a display screen disposed at one end of said envelope and an electron gun assembly disposed at a second end of said envelope, said electron gun assembly producing an electron beam that forms a raster at electron beam landing locations on said screen;
   a main horizontal deflection winding and a main vertical deflection winding disposed on a neck of said cathode ray tube;
   means for generating a horizontal deflection current in said horizontal deflection winding and a vertical deflection current in said vertical deflection winding for producing a main deflection field in a beam path of said electron beam that varies in a manner to vary the electron beam landing location;
   means for generating a pulse having a transition edge that occurs during a given trace interval of one of said deflection currents; and
   means responsive to said pulse for generating and synchronizing a waveform of a second field that is generated in said beam path such that said waveform of said second field is synchronized by said transition edge of said pulse and has a level that varies in accordance with the variation of the beam landing location to correct for an electron beam landing error.

2. An apparatus according to claim 1 wherein said pulse generating means senses said one current and generates said pulse at a time when a magnitude of said one current is close to being zero.

3. An apparatus according to claim 2 wherein said pulse generating means senses said horizontal deflection current.

4. An apparatus according to claim 1 further comprising, delay means responsive to said pulse for generating a reset pulse having a leading edge that occurs close to and before a retrace interval of said one current.

5. An apparatus according to claim 1 wherein said pulse generating means comprises a transformer having a first winding that is coupled in series with one of said deflection windings that conducts said one current and means responsive to a transformer-coupled signal that is generated in a second winding of said transformer for generating said pulse in accordance with said transformer-coupled signal.

6. An apparatus according to claim 5 wherein said transformer comprises a toroidal bead core and a winding that conducts at least a portion of said one current such that said core operates in a flux saturation state, during a first portion of said trace interval, and in a nonsaturated state, during a second portion of said trace interval and wherein said pulse is generated when a change in the operation states occurs.

7. An apparatus according to claim 1 wherein said pulse generating means generates said transition edge close to an instant when zero crossing occurs in said one current.

8. An apparatus according to claim 1 wherein said one current is said horizontal deflection current.

9. An apparatus according to claim 1 wherein said second field generating means comprises an auxiliary winding disposed on said cathode ray tube and means responsive to said pulse for generating a current in said auxiliary winding that produces a magnetic field having said waveform that is synchronized by said transition edge of said pulse.

10. An apparatus according to claim 1 wherein said second field generating means comprises means for generating at least one of a horizontal parabola signal and a horizontal sawtooth signal.

11. An apparatus according to claim 10 wherein each of said parabola and sawtooth signals is at a frequency that is substantially higher than that of horizontal sync pulses in the NTSC standard.

12. An apparatus according to claim 1 further comprising, a switch responsive to said pulse for generating a sawtooth ramp signal that is synchronized to said transition edge of said pulse.

13. An apparatus according to claim 12 further comprising, an integrator responsive to said sawtooth ramp signal for generating a parabolic signal that is coupled to said second field generating means.

14. An apparatus according to claim 1 further comprising, means responsive to said pulse for generating a reset signal that is time shifted relative to said pulse, wherein said second field generating means comprises a signal generator responsive to said reset signal for generating at least one of ramp and parabola signals that is reset when said reset signal occurs.

15. An apparatus according to claim 14 wherein said signal generator includes a ramp signal generator for generating a ramp signal and an integrator, responsive to said ramp signal, at least one of said ramp signal generator and said integrator being reset by said reset signal.

16. An apparatus according to claim 15, wherein said ramp signal generator comprises a constant current supply coupled to a capacitor for producing said ramp signal, and switching means for discharging the capacitor, the switching means being operated by said reset signal.

17. An apparatus according to claim 15 wherein said integrator comprises an amplifier having a feedback capacitor, and further comprising switching means for discharging said feedback capacitor, operated by said reset signal.

18. An apparatus according to claim 15, wherein said ramp signal generator comprises a constant current supply coupled to a first capacitor for producing said ramp signal, and a first transistor in parallel with said capacitor, wherein said integrator comprises an amplifier having a feedback capacitor, a second transistor in parallel with said feedback capacitor and wherein said first and second transistors are coupled to said reset signal such that said first capacitor and said feedback capacitor are discharged by said reset signal.

19. An apparatus according to claim 1, wherein said pulse generating means comprises a transformer having a winding that is coupled in series with said main horizontal deflection winding to generate said pulse upon a change between a saturation state and a nonsaturation state of a core of said transformer.

20. An apparatus according to claim 19 further comprising, a first one-shot, responsive to said pulse, for producing a reset signal at a predetermined time delay relative to a time when a change in a saturation state of a core of said transformer occurs.

21. An apparatus according to claim 20, wherein said reset signal has a leading edge that occurs a predetermined interval prior to an occurrence of a flyback pulse and a trailing edge that occurs prior to an end time of said flyback pulse.

22. An apparatus according to claim 21, wherein said reset signal occurs about 1.5 microseconds prior to a leading portion of said flyback pulse.

23. An apparatus according to claim 21, wherein said one-shot produces a signal that is coupled to a second one-shot for producing said reset signal after a delay time defined by said first one-shot.

24. A video display apparatus, comprising:
a cathode ray tube including an evacuated glass envelope, a display screen disposed at one end of said envelope and an electron gun assembly disposed at a second end of said envelope, said electron gun assembly producing an electron beam that forms a raster at electron beam landing locations on said screen;
a main horizontal deflection winding and a main vertical deflection winding for producing a main deflection field in a beam path of said electron beam that varies in a manner to vary the electron beam landing location;
means for generating a deflection current in at least one of said horizontal and vertical deflection windings;
a transformer having a first winding that is coupled in series with said one deflection winding for producing a pulse signal in a second winding of said transformer having a transition edge that is indicative when said deflection current is at a predetermined level during a period of said deflection current;
means responsive to said pulse signal for delaying said pulse signal; and
means responsive to said delayed pulse signal for generating a second field in said beam path that corrects a beam landing error of said electron beam, in accordance with said delayed pulse signal.

25. A video display apparatus, comprising:
a cathode ray tube including an evacuated glass envelope, a display screen disposed at one end of said envelope and an electron gun assembly disposed at a second end of said envelope, said electron gun assembly producing an electron beam that forms a raster at electron beam landing locations on said screen;
a main horizontal deflection winding and a main vertical deflection winding disposed on a neck of said cathode ray tube;
means for generating a horizontal deflection current in said horizontal deflection winding and a vertical deflection current in said vertical deflection winding for producing a main deflection field in a beam path of said electron beam that varies in a manner to vary the electron beam landing location;
means coupled to said deflection currents generating means responsive to said horizontal deflection current for sensing when, during a portion of a trace interval of said horizontal deflection current, said horizontal deflection current is at a predetermined magnitude to produce a pulse when said predetermined magnitude occurs; and
means responsive to said pulse for generating and synchronizing a waveform of a second field that is generated in said beam path and that varies in accordance with the variation of the beam landing location to correct for an electron beam landing error such that said waveform of said second field is synchronized by said pulse.

* * * * *